United States Patent
Taylor et al.

(10) Patent No.: US 6,853,394 B2
(45) Date of Patent: Feb. 8, 2005

(54) RADIATION-CURABLE THERMAL PRINTING INK AND INK RIBBONS AND METHODS OF MAKING, USING AND PRINTING USING THE SAME

(75) Inventors: Jeffrey F. Taylor, Greensburg, PA (US); John T. Whalen, North Huntingdon, PA (US); Lara A. Reed, Uniontown, PA (US); Richard G. Crooks, Apollo, PA (US); Marlee A. Vrbanic, Greensburg, PA (US)

(73) Assignee: Sony Chemicals Corporation of America, Mt. Pleasant, PA (US)

( * ) Notice: Subject to any disclaimer, the term of this patent is extended or adjusted under 35 U.S.C. 154(b) by 0 days.

(21) Appl. No.: 10/202,805

(22) Filed: Jul. 25, 2002

(65) Prior Publication Data

US 2003/0020798 A1 Jan. 30, 2003

Related U.S. Application Data

(62) Division of application No. 09/632,030, filed on Aug. 2, 2000, now Pat. No. 6,476,840.

(51) Int. Cl.[7] .............................................. B41J 2/335
(52) U.S. Cl. ..................................... 347/212; 347/217
(58) Field of Search ................................ 367/212, 217; 400/120.18; 428/32.6–32.87; 430/97

(56) References Cited

U.S. PATENT DOCUMENTS

| | | | |
|---|---|---|---|
| 4,052,280 A | | 10/1977 | McGinnis |
| 4,164,423 A | | 8/1979 | Schumacher et al. |
| 4,637,743 A | * | 1/1987 | Kerner et al. ............... 400/124 |
| 4,924,599 A | | 5/1990 | Bubley |
| 5,380,769 A | * | 1/1995 | Titterington et al. ......... 523/161 |
| 5,489,567 A | * | 2/1996 | Koshizuka et al. .......... 503/227 |
| 5,492,370 A | * | 2/1996 | Chatwin et al. ............. 283/110 |
| 5,521,392 A | | 5/1996 | Kennedy et al. |
| 5,529,972 A | * | 6/1996 | Ramello et al. ............. 503/227 |
| 5,560,796 A | * | 10/1996 | Yoshimura ................... 156/240 |
| 5,621,020 A | * | 4/1997 | Khatib et al. ................. 522/99 |
| 5,645,888 A | * | 7/1997 | Titterington et al. ......... 427/256 |
| 5,674,626 A | * | 10/1997 | Khatib et al. ................ 428/447 |
| 5,867,201 A | | 2/1999 | Ueda |
| 5,919,557 A | * | 7/1999 | Lorenz et al. .............. 428/321.5 |
| 5,952,098 A | * | 9/1999 | Lorenz et al. ............... 428/341 |
| 6,025,017 A | * | 2/2000 | Roth ........................... 427/146 |
| 6,040,040 A | * | 3/2000 | Rainbow .................... 428/32.6 |
| 6,060,040 A | * | 5/2000 | Tournier et al. .......... 424/9.364 |
| 6,245,711 B1 | * | 6/2001 | Halbrook, Jr. ............... 503/206 |
| 6,325,805 B1 | * | 12/2001 | Ogilvie et al. ................ 606/75 |
| 6,352,805 B1 | | 3/2002 | Taylor et al. |
| 6,365,323 B1 | * | 4/2002 | Narang et al. ............ 430/280.1 |
| 6,476,840 B1 | * | 11/2002 | Taylor et al. ................ 347/212 |

FOREIGN PATENT DOCUMENTS

| | | | | |
|---|---|---|---|---|
| GB | 2142579 A | * | 1/1985 | ............ B41M/7/00 |
| JP | 357129770 A | | 8/1982 | |

OTHER PUBLICATIONS

Klaus Pochner, Photochemical Fixing with UV Radiator, German Patent Application No. 4,342,643, Published Mar. 16, 1995.

Norman Huxford et al., Printing With Ink Ribbons, UK Patent Application No. 2 211 791, Published Jul. 12, 1989.

* cited by examiner

Primary Examiner—Huan Tran
(74) Attorney, Agent, or Firm—Eckert Seamans Cherin & Mellott, LLC

(57) ABSTRACT

A radiation-curable ink, a method of making the ink, a thermal transfer printer ribbon having a radiation-curable ink layer, and a thermal transfer printer with an actinic energy source are provided. A method of thermal transfer printing using an ink ribbon having radiation-curable components is also provided. The radiation curable components of the ink can be thermally dried and are cured after printing of an image on a receiving article.

12 Claims, 4 Drawing Sheets

RADIATION-CURABLE THERMAL PRINTING INK AND INK RIBBONS AND METHODS OF MAKING, USING AND PRINTING USING THE SAME

CROSS REFERENCE TO RELATED APPLICATION

This application is a divisional application of U.S. application Ser. No. 09/632,030, filed Aug. 2, 2000, now U.S. Pat. No. 6,476,840.

FIELD OF THE INVENTION

The present invention relates to a radiation-curable thermal printing ink and thermal printing ink ribbons which employ such a radiation-curable thermal printing ink for printing character and/or bar code images on articles such as labels. The present invention also relates to methods of making and printing using such radiation-curable thermal printing ink and ink ribbons.

BACKGROUND INFORMATION

Thermal printing ink ribbons have long been used as a means for printing on various articles information such as bar code images. These thermal printing ink ribbons comprise an ink layer consisting of a colorant and a binder material such as wax on a heat-resistant base, and may be fitted to a printer so that the ink layer is molten under heat of the thermal head and transferred onto package and paper or a label to give a desired thermal bar code image thereon.

In recent years, transferred images that are printed using such a thermal printing ink ribbon have been required to be extremely sharp in appearance. One method of obtaining sharper transferred images includes the addition of fine particles of a heat setting resin such as silicon resin or the like to the ink layer of a thermal transfer ink ribbon whose binder mainly comprises wax. This improves the ability of the ink layer to be separated sharply from the base and results in a sharper image.

Another method includes using a thermally fusible resin such as a thermoplastic resin, instead of wax, as a main constituent of the binder. While the use of a thermoplastic resin is effective to improve heat resistance and wear resistance of transferred images, however, the ability of the ink layer to be sharply transferred from the base is reduced. This fails to produce an image of sufficient clarity. Resin binders and/or waxes of higher melting points can also provide a higher degree of scratch and smear resistance. However, higher print head energies are necessary to achieve the desired flow to promote transfer and adhesion to a receiving article.

There are some limitations on the applications for thermal transfer printing. For example, the properties of the thermal transfer formulations which permit transfer from the carrier to a receiving substrate can place limitations on the permanency of the printer matter. Printed matter from conventional processes can smear or smudge, especially when subjected to a subsequent sorting operation. Additionally, where the surface of a receiving substrate is subject to scratching the problem is compounded. This smearing can make character recognition such as optical character recognition or magnetic ink character recognition difficult and sometimes impossible. In extreme cases, smearing can make it difficult to read bar codes. Additionally, exposure of the image to various chemicals can be detrimental.

U.S. Pat. No. 6,025,017 discloses a UV or visible light curable coating formulation which uses monomers and oligomers for the purpose of reducing or eliminating solvents during the manufacturing process. This coating is cured during the manufacture of the ribbon, prior to any printing, to form a thermoplastic polymer that can be thermally transferred to a receiving substrate.

U.S. Pat. No. 6,040,040 discloses a radiation curable thermal printing ink which is selectively cured during ribbon manufacture, prior to printing. The ink is applied to a substrate in multiple or graded layers.

U.S. Pat. Nos. 5,919,557 and 5,952,098 relate to a thermal transfer medium having reactive components that cross-link when heated. Radiation-curable components are not disclosed.

Many attempts have been made to provide high integrity thermal transfer printing which is resistant to degradation due to chemical, heat and physical damage, some of which are described above. There is a continuing effort to provide alternative thermal transfer media which can form printed images with high resistance to these kinds of damage.

SUMMARY OF THE INVENTION

The present invention provides a thermal transfer printer ribbon which comprises a substrate and an ink layer disposed on the substrate, the ink layer having radiation-curable components. The radiation-curable components of the ink layer are compounds such as monomers and/or oligomers which when exposed to radiation cross-link and provide improved resistance to chemical, heat and physical damage to the transferred image. This is accomplished via a thermosetting polymerization mechanism. The ink layer of the present invention can be thermally dried on the ribbon while remaining in the uncured state.

Also included in the present invention is a method of making a thermal transfer printer ribbon in which the ink layer can be thermally dried as a final step in preparation of the ribbon.

The invention also provides a method of thermal transfer printing comprising providing a thermal transfer printer, an ink ribbon having radiation-curable components and a receiving article to be printed. A radiation-curable ink ribbon is positioned between the print head of the printer and the receiving article, and contact is established between the ribbon and the print head. The temperature of selected portions of the ribbon is then elevated to effect transfer of ink to a receiving article. The radiation-curable components are cured after printing, by a variety of methods.

A thermal transfer printer having an actinic energy source attached externally or internally is also included in the present invention.

It is an object of the present invention to provide a thermal transfer medium which provides improved damage resistant images, and permits use of conventional thermal printers.

It is an additional object of the present invention to provide an ink formulation for thermal transfer printing which contains radiation-curable components which can be thermally dried.

It is another object of the invention to provide a ribbon for thermal transfer printing having such a radiation-curable ink.

It is a further object of the invention to provide a method of printing using thermal printers wherein the radiation-curable components are cured after printing.

An additional object of the invention is to provide a thermal transfer printer having an actinic energy source.

An additional object of the invention is to provide greater damage resistant images through the use of thermal transfer printing ink ribbons having ink with radiation-curable components.

Figure 1:
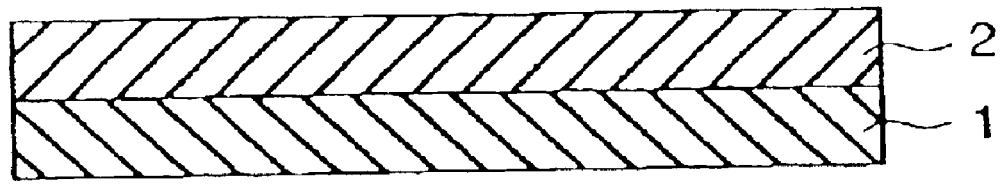
FIG. 1 is a cross-sectional view of a thermal printing ink ribbon of the present invention.
Figure 2:
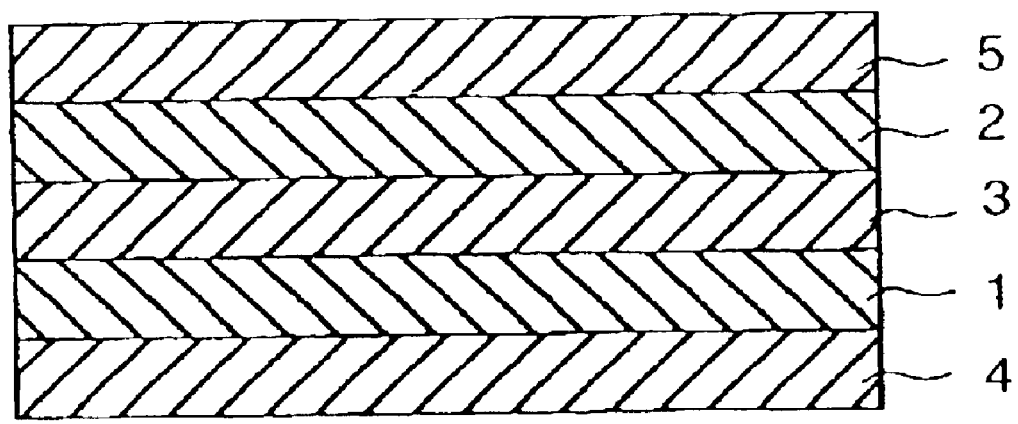
FIG. 2 is a cross-sectional view of an additional embodiment of a thermal printing ink ribbon of the present invention.

Numerical references represent the following elements: 1: the substrate of the ribbon; 2: the ink layer of the ribbon: 3: the primer or wax-release layer of the ribbon; 4: the backcoat layer of the ribbon; 5: the topcoat layer.

DETAILED DESCRIPTION OF THE INVENTION

The thermal transfer printing medium of the present invention comprises a radiation-curable ink layer 2 disposed on a substrate 1. A primer 3 and a backcoat 4 can also be applied to the substrate. Also optional is a topcoat layer 5.

The substrate 1 material preferably has high heat-resistant strength, dimensional stability and surface smoothness. Examples of suitable materials include polyolefins, such as polyethylene and polypropylene; polyesters, such as polyethylene terephthalate and polyethylene napthalate; polyamides, such as nylon; polyimides; chlorine-containing resins, such as polyvinyl chloride and polyvinylidene chloride; polystyrene resins, such as polystyrene and derivatives thereof; fluorine-containing resins, such as polytetrafluoroethylene; polycarbonates; papers such as glassine paper and condenser paper; and metal foils. Substrates made of a blend of these resins or composite substrates composed of different laminate of these materials can also be used. Other materials having suitable properties can also be used. Suitable substrates may be prepared by conventional methods known to those of ordinary skill in the art. A substrate formed of polyethylene terephthalate is preferably used in the present invention as it has high tensile strength, wrinkle resistance, and excellent heat resistance. The substrate preferably has a thickness of about 0.5 to 20 $\mu$m, more preferably 4.0 to 6.0 $\mu$m.

Optionally, a primer layer 3 can be used. The primer can contain wax release components and/or resin adhesive components. The primer layer, if used, is disposed between the substrate and the ink layer.

The wax release components improve release properties of the radiation-curable ink layer. The wax component is not particularly limited, and any wax component can be used. Specific examples of suitable wax components include polyethylene wax, paraffin wax, rice bran wax, microcrystalline wax, carnauba wax, shellac wax, montan wax, higher fatty acids (i.e., $C_2$ or greater fatty acids), higher fatty acid amides (i.e., $C_2$ or greater fatty acid amides), and higher alcohols (i.e., $C_2$ or greater alcohols). These wax components may be used either individually or as a combination of two or more thereof.

In order to improve coating film strength or softness of the primer layer, the primer layer may further comprise one or more resins, such as an ethylene-vinyl acetate copolymer, an ethylene-acrylic acid copolymer, polyethylene resins, and petroleum resins, in an amount that would not impair the effectiveness of the present invention.

It is generally preferable that the primer layer have a thickness of from about 0.1 to 5.0 $\mu$m, more preferably between about 0.1 to 3.0 $\mu$m.

The primer layer may further comprise non-pigmented monomers and/or oligomers that can be cured by actinic radiation to form an overcoat layer on the transferred image.

The thermal transfer recording medium of the present invention may have a backcoat layer 4 on the substrate on the side opposite to the ink layer for the purpose of improving heat resistance or running properties. A backcoat layer is particularly advantageous for recording with a thermal head.

The backcoat layer 4 is conventionally known to those of skill in the art and is generally formed of nitrocellulose compounds, silicone compounds or fluorine-containing compounds. The backcoat layer is preferably formed of a reaction product between an amino-modified silicone oil (e.g., polydimethylsiloxane having an amino group introduced to part of its methyl group) with a polyfunctional isocyanate compound (e.g., toluene diisocyanate) or a silicone-butyral resin. While not limiting, the backcoat layer preferably has a thickness of 0.01 to 0.5 $\mu$m.

The thermal transfer recording medium may also have a topcoat layer 5 on the substrate disposed on the ink layer for the purpose of improved adhesion of the ink layer to the substrate and to provide greater resistance to scratching and smearing.

The topcoat layer is generally known to those of skill in the art, and is comprised of polyesters, polyketones or thermally fuseable resins. Preferably, the topcoat is applied with a thickness of 0.1 to 1.0 $\mu$m.

The radiation-curable ink layer 2 contains monomers and/or oligomers and mixtures thereof. These monomers and oligomers have the ability to cross-link when exposed to radiation. The monomers and oligomers of the present invention are preferably polymerized by a free-radical mechanism to form a thermoset polymer. As used herein, the term "thermoset polymers" refers to those polymers which can be cured and crosslinked to form a solid state network that will not flow upon heating nor dissolve upon exposure to chemicals. Examples of suitable monomers and oligomers include, but are not limited to, triacrylates and trimethacrylates; acrylates and methacrylates having four or more reactive groups such as dipentaerythritol tetra-acrylate and tetra-methylolmethane tetra-acrylate; oligomers of these compounds; aliphatic and aromatic urethane acrylates; polyester acrylates; acrylic acrylates; vinyl ether capped oligomers; cycloaliphatic epoxy based monomers or oligomers; and other monomers and oligomers which are solid at room temperature. This property permits thermal drying of the ink layer. Other compounds having fewer functional groups may also be suitable, provided they exhibit this property. Extensive cross-linking provides the improved damage resistance properties of the ink of the present invention.

Monomers and/or oligomers will be present in the ink layer 2 in an amount of about 1 to 90% by weight, based on the total weight of the ink. More preferably, monomers (when used) will be present in the amount of about 1 to 40% by weight, and oligomers (when used) will be present in the amount of about 1 to 45% by weight. All weight percentages are based on the total weight of the ink layer.

Where curing is intended with electron beam, additional components to effect the cure may not be required. When curing is intended with ultra-violet or visible light, photo-initiators are used to initiate the cross-linking of the monomers and/or oligomers. As used herein, "actinic energy source" refers to those sources of energy which are capable of initiating photochemical reactions.

Photoinitiators used are those well known in the art. Suitable photoinitiators for use in free radical or vinyl ether reactions include, but are not limited to, acetophenone, 2,2-diethoxyacetophenone, p-dimethylaminoacetophenone, p-dimethylaminopropiophenone, benzophenone, 2-chlorobenzophenone, p,p'dichlorobenzophenone, p,p'-bisdiethylaminobenzophenone, Michler's ketone, benzyl, benzoin, benzoinmethylether, benzoinethylether, benzoinisopropylether, benzoin-n-propylether, benzoinisobutylether, benzoin-n-butylether, benzylmethylketal, tetramethylthiuram-monosulphide, thioxanthone, 2-chlorothioxanthone, 2-methylthioxanthone, azobisisobutylonitrile, benzoinperoxide, di-tert-butylperoxide, p-isopropyl-alphahydroxyisobutylphenone, alphahydroxyisobutylphenone, diethylthioxanthone, 2,2-dimethoxy-2-phenyl acetophenone and other similar compounds. Suitable photoinitiators for use in cationic reactions include triaryl sulfonium hexafluorophosphate, triaryl sulfonium hexafluoroantimonate, diaryl iodonium hexafluoroantimonate, and the like.

If desired, additives may be added to enhance certain properties of the ink. Colorants known to those of skill in the art may be used in the ink layer 2 and include black dyes and pigments, e.g., carbon black, Oil Black, and graphite; acetoacetic acid arylamide type monoazo yellow pigments (Fast Yellow), e.g., C.I. Pigment Yellow 1, 3, 74, 97 and 98; acetoacetic acid arylamide type bisazo yellow pigments, e.g., C.I. Pigment Yellow 12, 13 and 14; yellow dyes, e.g., C.I. Solvent Yellow 19, 77 and 79, and C.I. Disperse Yellow 164; red pigments, e.g., C.I. Pigment Red 8, 49:1, 53:1, 57:1, 81, 122, and 5; red dyes, e.g., C.I. Solvent Red 52, 58 and 8; copper phthalocyanine dyes and pigments and derivatives thereof or modified compounds thereof, e.g., C.I. Pigment Blue 15:3; and the like. In addition, colored or colorless sublimation dyes, conventional printing inks, and dyes and pigments well known for other coloring purposes may also be used. These dyes and pigments may be used either individually or as a mixture of two or more thereof. As a matter of course, the dyes and pigments may be mixed with extender pigments or white pigments for color toning. For the purpose of improving dispersability in binders, the colorant may be subjected to surface treatments such as with a surfactant, a coupling agent such as a silane coupling agent, or a high polymeric material. High polymeric dyes or high polymer-grafted pigments may be used for the same purpose.

When used, the colorant is preferably present in the amount of about 1 to 40% by weight of the total ink layer, and more preferably in the amount of 15 to 30% by weight of the ink layer.

If desired, the ink layer 2 may contain binders. Suitable binders include homopolymers of styrene or a derivative or substituted product thereof, methacrylic acid or an ester thereof, acrylic acid or an ester thereof, a diene compound, or vinyl polymers; and other resins, such as polycarbonate resins, polyester resins, silicone resins, fluorine-containing resins, phenolic resins, terpene resins, petroleum resins, hydrogenated petroleum resins, alkyd resins, ketone resins, and cellulose derivatives. These binders may be used either individually or as a polymer blend of two or more thereof.

When a binder is used, it may be present in the amount of about 1 to 50% by weight of the total ink layer, more preferably between about 5 and 20% by weight of the ink layer.

If desired, the ink layer 2 may contain additional coating additives such as waxes, oils, or liquid plasticizers which have been used as heat-fusible substances in conventional thermal transfer media. In addition, the ink layer or other layers may contain chlorinated paraffins, low-molecular weight urethane compounds, plasticizers that are solid at room temperature, charge control and/or antistatic agents (e.g., surface active agents), electroconductivity imparting agents, antioxidants, thermal conductivity improvers, magnetic substances, ferroelectric substances, antiseptics, flavors, antiblocking agents, reinforcing fillers, releasing agents, foaming agents, sublimation substances, infrared absorbers, and the like.

The ink layer 2 may be prepared by conventional methods known to those of skill in the art. To prepare an ink having radiation-curable monomers or oligomers, a resin binder (if used) is added to a solvent, and the photoinitiators (if used) are added immediately following the binders. The solution is allowed to mix until all materials are dissolved. Monomers and/or oligomers are then added slowly (either singly or in combination) and allowed to dissolve into the system. Lastly, the colorant, prepared by methods well known in the art, is added and mixed, thereby producing the thermal printing ink.

The ink layer 2 can be obtained by preparing the ink described above and applying it to the substrate by conventional coating techniques such as gravure coating, to provide the desired coating thickness of about 0.1 to 10 $\mu$m, more preferably of 0.1 to 5.0 $\mu$m. After the ink is applied to the substrate, the substrate is passed through a dryer at an elevated temperature to ensure drying and adherence of the coating onto the substrate. Due to the unique properties of the monomers and/or oligomers of the present invention, thermal drying of the ink layer can be achieved.

Figure 3:
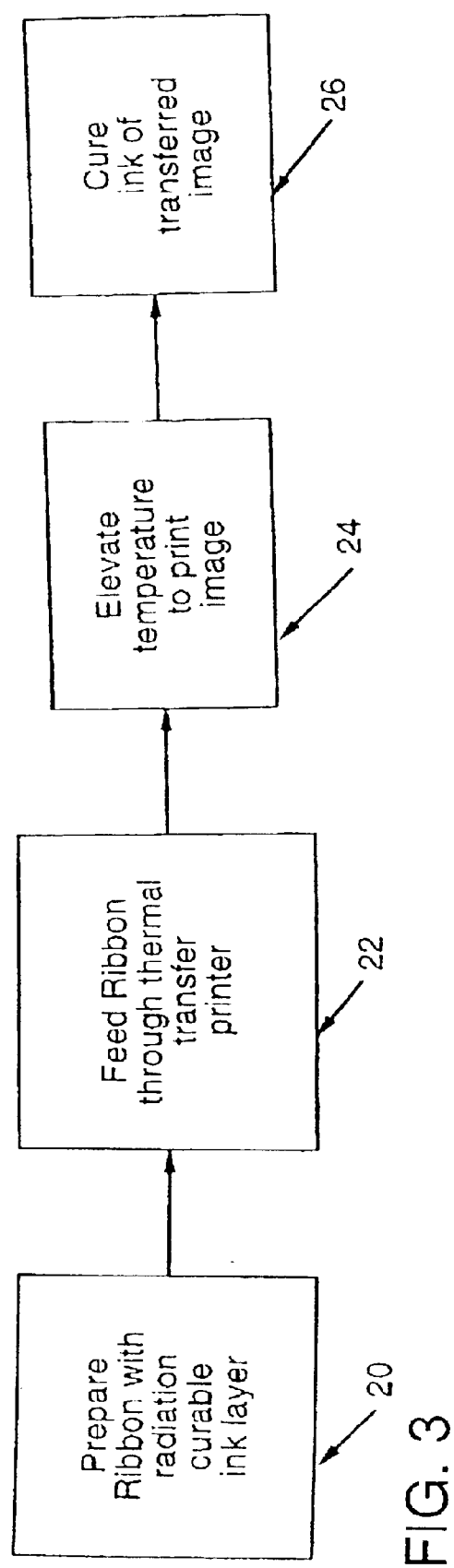
FIG. 3 is a schematic diagram of the steps included in an embodiment of the printing method of the present invention.

Referring now to FIG. 3, printing with the radiation-curable ink ribbon of the present invention is accomplished by methods well known in the art, with an additional step of curing the radiation-curable components of the ink. An ink ribbon having an ink layer with radiation-curable components 20 is fed through a thermal transfer printer 22. The ribbon is brought into contact with the print head of the printer, and the temperature is elevated in selected portions of the print head 24, usually through the use of a microprocessor. Elevation of temperature causes a selected portion of the ink to transfer to a receiving article with the desired image. The transferred ink is then cured upon exposure to a source of actinic energy 26.

Figure 4:
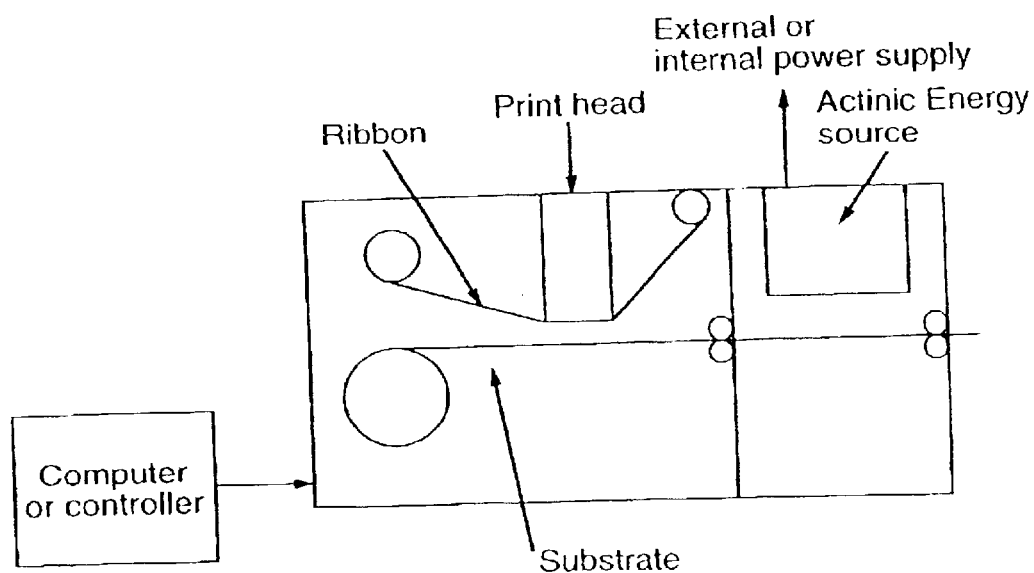
FIG. 4 is a representation of one embodiment of a printer of the present invention.
Figure 5:
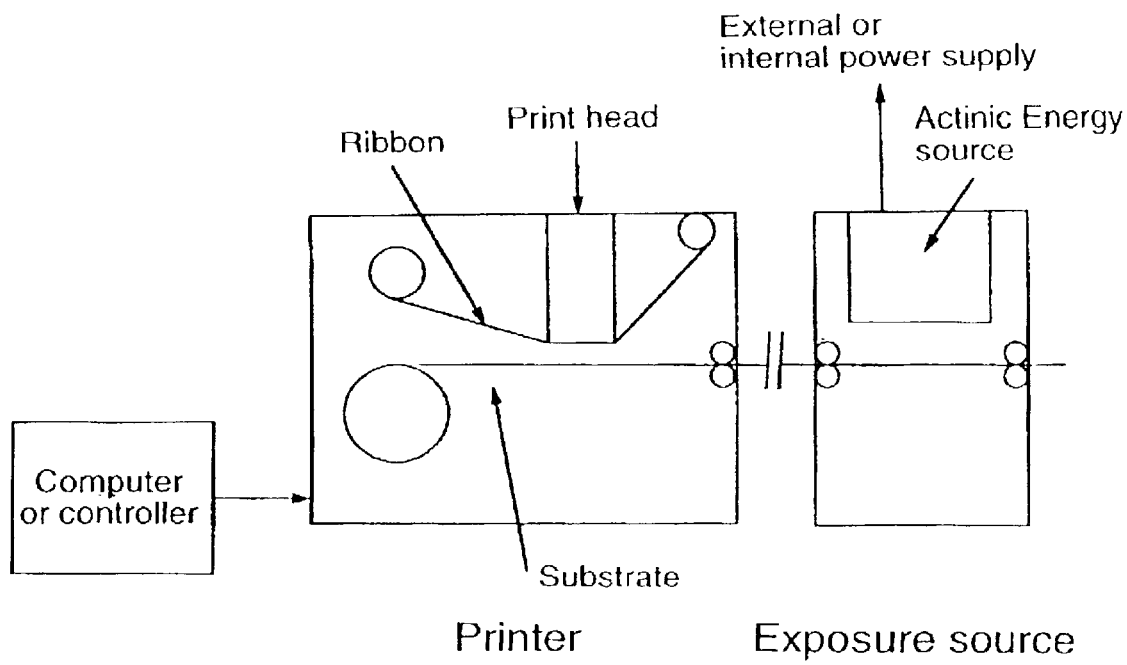
FIG. 5 is a representation of an additional embodiment of a printer of the present invention.

The thermal transfer printer of the present invention includes a thermal transfer printer and an actinic energy source. This can be provided internally (as shown in FIG. 4), as an integral part of the printer, or externally as an attachment or secondary unit (as shown in FIG. 5).

The present invention contemplates many different methods of curing with many types of radiation. Curing of the radiation-curable components of the ink is done after printing. Types of radiation appropriate for curing inks of the present invention include electron beams, UV and visible light. Higher irradiance (measured in $mW/cm^2$) results in a higher dosage (in $mJ/cm^2$). After the image has been transferred to a receiving article, the article is exposed to a radiation source which emits light at a given intensity, exposing the printed image to the proper dosage to initiate crosslinking. The dosage and chemical resistance are directly proportional up to a point at which too high a dosage causes over-crosslinking. This may lead to a drop-off in the chemical resistance properties.

EXAMPLE

Thermal transfer ribbons were prepared that included one or more of the following: a binder, pigment and a 2 or 3 part light reactive component. This light reactive component includes a photoinitiator and chemicals, such as monomers and/or oligomers, which will react with the photoinitiator to form a cross-linked network. These samples were prepared to examine the influence of the additional reactive sites present upon exposure of the printed image to ultraviolet light. One of the samples did not contain a solvent soluble resin binder. The formulations were prepared according to Table 1 (which are listed in weight %).

TABLE 1

Liquid Ink Formulations

| Chemical Name | Generic Description | Sample 1A | Sample 1B |
|---|---|---|---|
| Methyl Ethyl Ketone | Solvent | 20.0 | 25.0 |
| Ketone resin | Resin binder | 3.0 | — |
| Polyester resin | Resin binder | 2.0 | — |
| 2-benzyl-2-N,N-dimethylamino-1-(4-morpholinophenyl)-1-butanone | Photoinitiator | 1.5 | 1.5 |
| 1-hydroxycyclohexyl phenyl ketone | Photoinitiator | 1.5 | 1.5 |
| Aromatic acid acrylate half ester | Oligomer | 23.0 | 23.0 |
| Tris (2-hydroxy ethyl) isocyanurate triacrylate | Triacrylate monomer | 15.0 | 15.0 |
| Pigment dispersion | Pigment dispersion | 34.0 | 34.0 |

The pigment dispersion was comprised of 70% MEK, 5% dispersant, and 25% carbon black. The dispersion was made using a lab scale steel ball mill, a Szegvary Attritor System. MEK was added to the Attritor mill and mixed at a mixing speed setting of 5 (210–220 rpm). The dispersant was then added and allowed to mix for 30 minutes. The carbon black was then added, the mixing speed setting increased to 6 (270–280 rpm) and the system was allowed to mix for 30 minutes. After 30 minutes the dispersion was drawn down on PET film using a #3 Meyer rod and dried. A 60°-gloss measurement was done and a resultant reading between 95–110% signified that the dispersion was complete. The dispersion was collected in a metal container and stored for later use.

Samples A and B were made up and stored in plastic amber bottles. These bottles serve as a means to prevent the ink from being exposed to stray UV light produced by fluorescent lamps and other sources. They were mixed using a standard, marine style, stainless steel mixing prop. The tip speed was set at speeds fast enough to create a vortex in the system to assure proper mixing. The speed varied with the viscosity of the system as high viscosity and low viscosity materials were added.

For samples A and B, the weight percentages in Table 1 were used. MEK was added to the amber bottle, followed by the ketone and polyester resins (resins not used in sample B). The photoinitiators were added immediately following the resin binders. The solution was allowed to mix until all of the materials dissolved. The aromatic acid acrylate half ester (Sarbox SB 404 manufactured by Sartomer Company) was added slowly and allowed to dissolve into the system. Mixing speed was increased because of the high viscosity of this material. The next light reactive component, the triacrylate monomer, was added slowly and allowed to dissolve into the system as well. Mixing speed increased because of the solid nature of this component causing an increase in viscosity. Lastly, the carbon black dispersion, described earlier, was added and mixing speed decreased somewhat due to the lowering of the viscosity, thereby preparing thermal transfer ink.

The inks were made into a thermal transfer ribbon. The substrate on which the ink was coated was a 4–5 micron thick polyethylene terephthalate film. A backcoat was used for this example, and was 100% polydimethyl siloxane, applied at a thickness of less than 0.5 microns. The primer used for this example was 90% montan wax and 10% ethylene vinyl acetate and was applied at a thickness of 0.5 microns or less.

Two methods were used to produce thermal transfer ribbons, manual and mechanical. Initial ribbons were made manually, using a Pamarco hand-proofer. No backcoat was applied when producing ribbon using this method. The primer described above was applied hot (82–85° C.) to the PET, also using a hand-proofer equipped with a gravure type cylinder, which was also kept hot. The ink sample was applied over the primer and the ribbon was then dried using a hot air gun. Backcoat, primer and sample A were applied using this method. The coating layers were each applied and dried prior to the addition of the next layer to drive off the solvents.

The ribbons were printed using an Intermec 3400 printer and a Zebra 140Xi model printer at speeds of 6 inches per second. The image was printed and then passed under UV light to initiate curing and cross-linking. The UV light source was a Fusion Systems Ultraviolet Apparatus, equipped with two Model HP-6 mercury doped lamps (also known as H-bulbs) with a lamp power of 467 watts per inch each. Only one lamp was used to cure this system at a belt speed of 30 feet per minute or 6 inches per second. The total lamp irradiance and dosage were measured using an UV Power Puck™ high energy UV radiometer manufactured by EIT®. Irradiance and dosage readings were taken in the UVA region at a belt speed of 30 feet per minute. The optimum dosage and irradiance were in the ranges of 415 $mJ/cm^2$ and 1870 $mW/cm^2$, respectively.

After exposing the print images to UV light, solvent resistance was tested according to ASTM D5402 test method. The data is reported as the number of double rubs needed to completely remove the ink from the rubbed area. A maximum of 200 rubs was the upper limit for this experiment. Table 2 contains the data with a graphic representation of the respective results in FIG. 6.

TABLE 2

MEK Rub Resistance

| UV Energy | | | | | | | | | |
|---|---|---|---|---|---|---|---|---|---|
| mJ/cm2 | 0 | 115 | 188 | 264 | 336 | 415 | 476 | 531 | 562 |
| mW/cm2 | 0 | 527 | 862 | 1227 | 1561 | 1870 | 2234 | 2323 | 2602 |
| Control | 3 | 3 | 3 | 3 | 3 | 3 | 3 | 3 | 3 |
| Sample 1A | 0.5 | 14 | 100 | 200 | 200 | 200 | 200 | 194 | 83 |
| Sample 1B | 0.5 | 8 | 25 | 114 | 61 | 127 | 165 | 200 | 137 |

Figure 6:
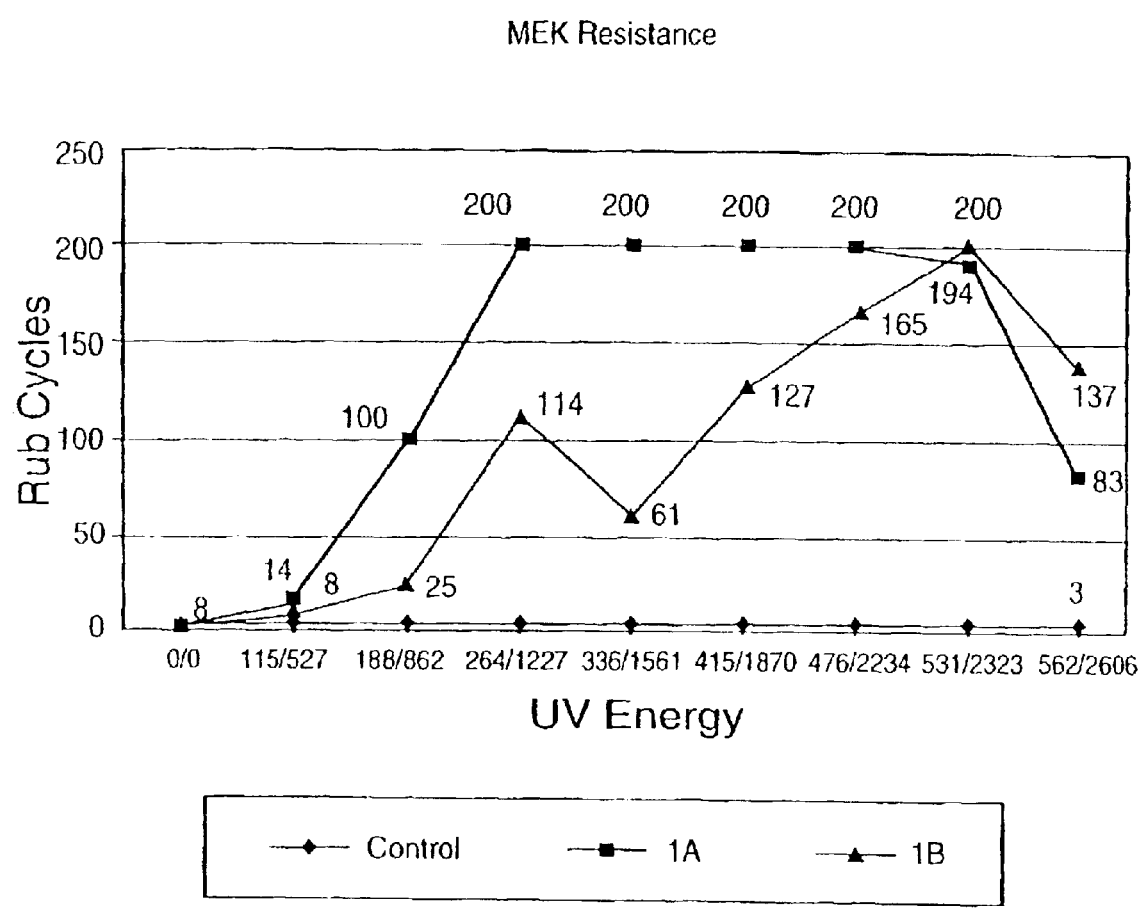
FIG. 6 is a graph which describes the relationship between solvent resistance and exposure to UV light.

As seen in the table and FIG. 6, solvent resistance improves over the control after exposure to UV light, and as the dose/irradiance increases, the improvement is very pronounced. A drop-off in chemical resistance is seen at the highest doses. This can be common if the UV system is over-cured and too tightly crosslinked. The control was not, at any time, exposed to UV light. The control was a standard resin system.

Heat resistance testing was done on printed images of sample 1A and the control using a Sencorp Systems heat seal machine, model number 808/1. The settings were 212° F./50 psi/1 sec dwell. The images were tested ink to ink and ink to unprinted label. In both cases, no image transfer or distortion was seen on sample 1A, but image transfer and distortion was evident on the control.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of thermal transfer printing comprising:
    providing a thermal transfer printer, an ink ribbon having an ink layer with radiation-curable components and a receiving article to be printed;
    positioning between the print head of said printer and said receiving article said radiation-curable ink ribbon;
    establishing contact between said ribbon and said print head;
    elevating the temperature of selected portions of said ribbon to effect transfer of said ink layer to said receiving article; and
    curing the radiation-curable components of said transferred ink layer, wherein the ink layer comprises about 1 to 90% by weight of at least one radiation-curable monomer or oligomer, about 1 to 15% by weight of a photoinitiator, and about 1 to 25% by weight of at least one coating additive, and wherein said ink layer can be thermally dried prior to printing and the radiation curable monomer or oligomer remains in the uncured state until after printing, at which time exposure of the monomer or oligomer to actinic radiation will result in a thermoset structure which will not flow when heated and is of enhanced durability.

2. The method of claim 1, wherein the curing is by electron beam.

3. The method of claim 1, wherein the curing is by UV light.

4. The method of claim 1, wherein the curing is by visible light.

5. The method of claim 1, wherein the photoinitiator is selected from the group consisting of 1-hydroxycyclohexyl phenyl ketone and 2-benzyl-2-N,N-dimethylamino-1-(4-morpholinophenyl)-1-butanone.

6. The method of claim 1, the ink layer further comprising: about 1 to 20% by weight of a binder.

7. The method of claim 6, wherein the binder is selected from the group consisting of homopolymers of styrene, derivatives or substituted products of homopolymers of styrene, methacrylic acid, esters of methacrylic acid, acrylic acid, esters of acrylic acid, dienes, vinyl polymers, polycarbonate resins, polyester resins, silicone resins, fluorine-containing resins. phenolic resins, terpene resins, petroleum resins, hydrogenated petroleum resins, alkyd resins, ketone resins, and cellulose derivatives.

8. The method of claim 1, the ink further comprising about 1 to 40% by weight of a colorant.

9. A thermal transfer printer comprising a thermal transfer print head, a ribbon feeder which feeds a thermal transfer ribbon to the heating elements of the thermal transfer print head, and an actinic energy source,
    said thermal transfer ribbon characterized as having an ink layer with radiation curable components, wherein said ink layer is thermally dried during formation of the ribbon and the radiation-curable components remain in the uncured state until after printing, at which time exposure of the monomer or oligomer to the actinic energy source will result in a thermoset structure which will not flow when heated and is of enhanced durability.

10. The thermal transfer printer of claim 9, wherein the actinic energy source is internal.

11. The thermal transfer printer of claim 9, wherein the actinic energy source is external.

12. The thermal transfer printer of claim 9, wherein the ink layer comprises about 1 to 90% by weight of at least one radiation-curable monomer or oligomer, about 1 to 15% by weight of a photoinitiator, and about 1 to 25% by weight of at least one coating additive.

* * * * *